Patented Nov. 11, 1930

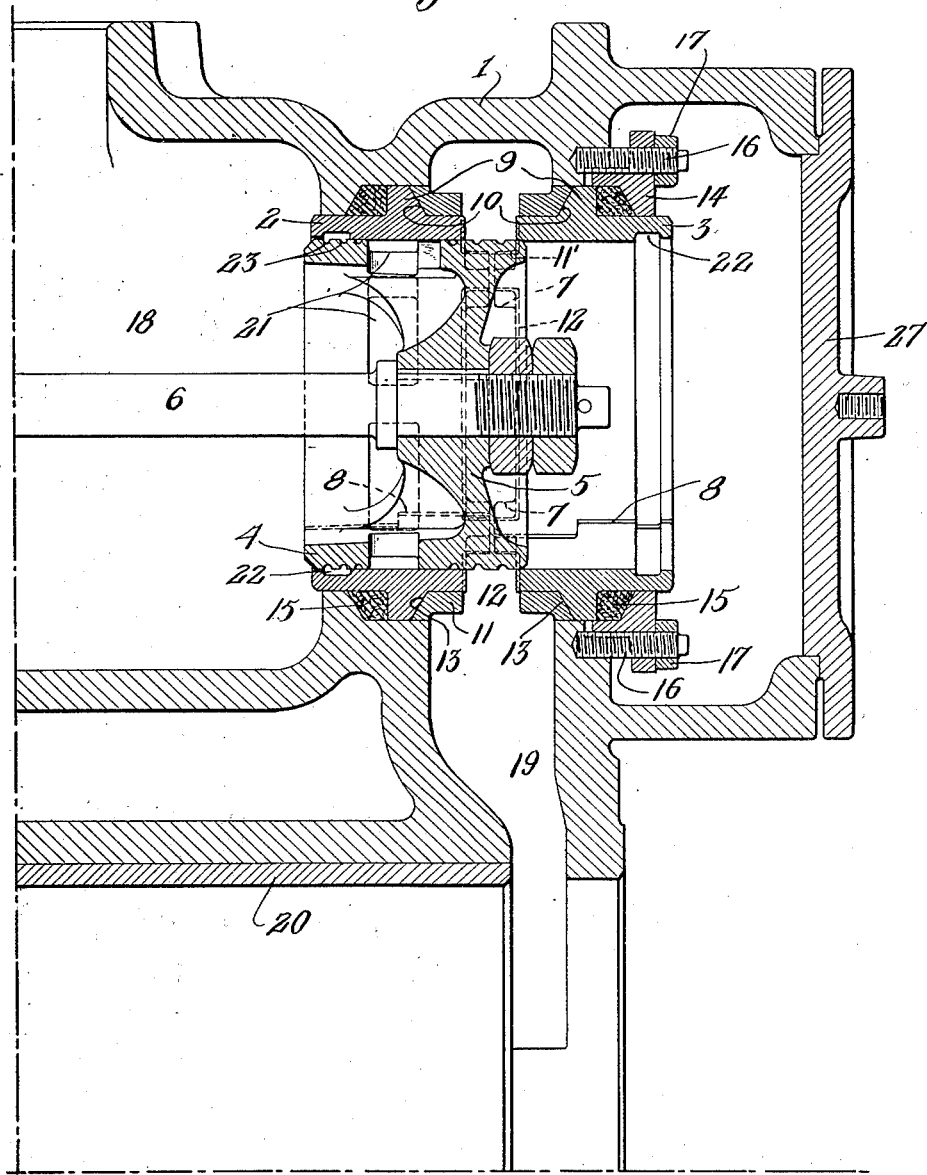

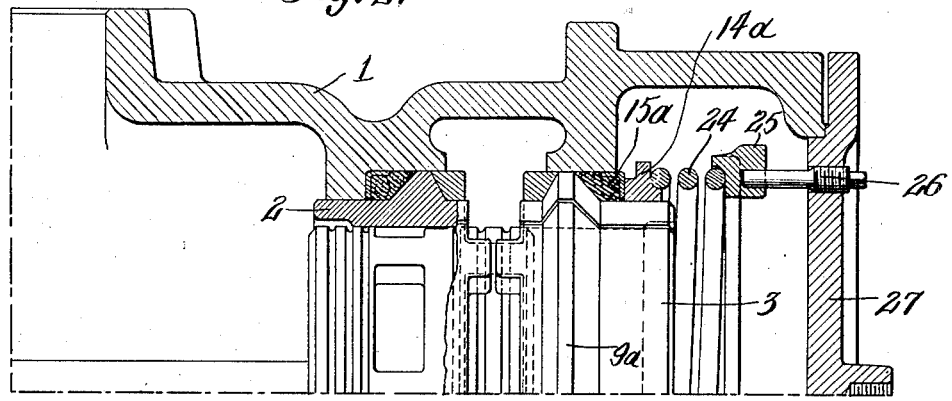
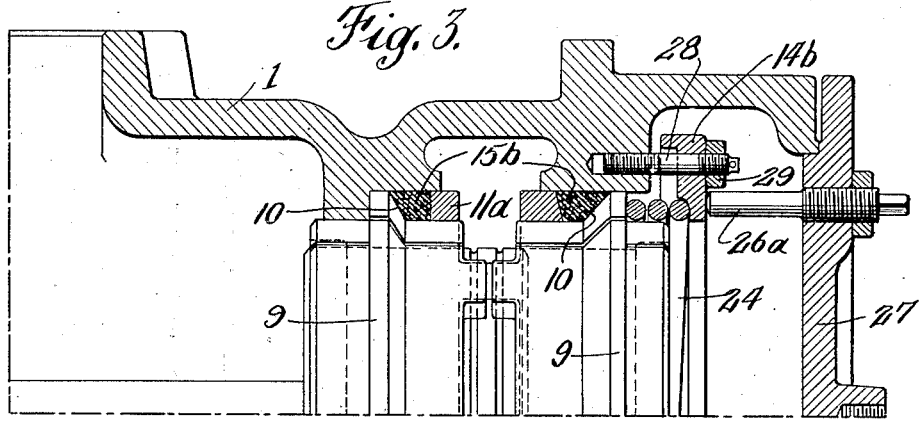
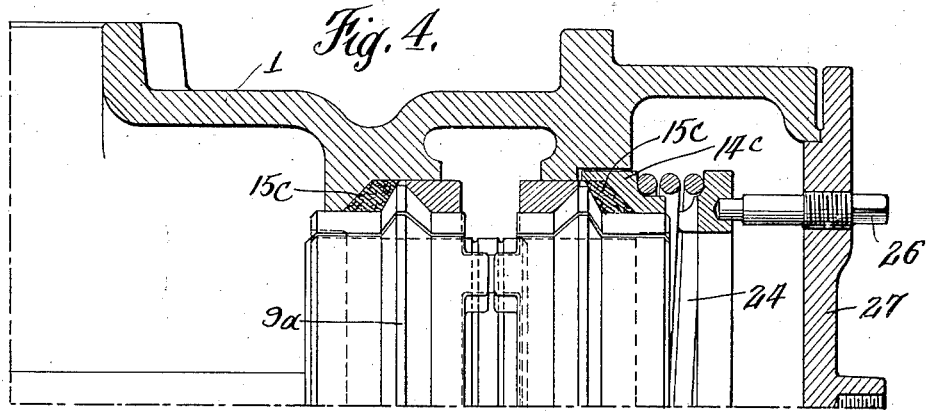

1,781,342

UNITED STATES PATENT OFFICE

SAMUEL S. RIEGEL, OF SCRANTON, PENNSYLVANIA

PISTON-VALVE AND BUSHING CONSTRUCTION

Application filed May 25, 1927. Serial No. 194,152.

This invention relates to improvements in piston valves such as are used, for example, in locomotives but it is to be understood that it is useful in connection with any type of motor in which a sliding valve mechanism is employed such, for example as some types of automobile or other gas engines.

The primary objects of the invention are to provide a valve device of the character described which is simple to construct, always tight in service and one in which replacement or renewal of worn parts can be quickly and easily made. It is also an object of the invention to provide a packless piston in a valve of this type.

Further objects of the invention are the provision of an inwardly collapsible bushing for a piston valve by means of which it is always possible to take up wear and thereby maintain fluid tightness and the provision of a piston valve in which the valve lap may be adjusted by longitudinally moving the bushing. It is also an object of the invention to provide maximum port openings so that there will at all times be the largest possible flow of fluid pressure.

The foregoing together with such other objects as may hereinafter appear or are incident to my invention I obtain by means of a construction which is illustrated in preferred form in the accompanying drawings, wherein Fig. 1 is a longitudinal section thru one end of a piston valve of the double spool type in which my improvements have been embodied and Figs. 2, 3 and 4 illustrate modifications of the general arrangement.

Referring to the drawings and particularly, in the first instance, to Fig. 1 it will be seen that I have provided the valve chamber 1 with a pair of spaced or opposing bushing members 2 and 3 in which one end of the double spool type piston valve 4 is adapted to reciprocate. The piston valve 4 is of the plug type and it will be seen that it is a simple cylindrical casting with a central hub portion 5 to which the rod 6 is connected, the rod being coupled at its other end (not shown in the drawing) to a duplicate member 4 in the manner familiar to those skilled in this art.

The bushing members 2 and 3 are spaced apart as stated and are provided with opposing stop lugs 7 which in the normal position of the bushing members are slightly spaced apart as illustrated.

The bushing members instead of being solid as is usual are longitudinally slotted, split or cut much in the manner of a split packing at some point 8 in their circumference. They are furthermore provided with an external ring or rib 9 one face 10 of which is bevelled or tapered.

Surrounding the adjacent ends of the bushing members 2 and 3 and between the ribs 9 is a member 11 with port way bridges 11' which I may term a port member inasmuch as it contains the ports 12, four of which are illustrated in the present instance. This port member has tapered faces 13 which are opposed to and adapted to cooperate with the tapered faces 10 on the bushing members.

It will be seen that if, as wear takes place, endwise pressure is supplied to the bushing members 2 and 3 the cooperating tapered faces 10 and 13 will cause a slight inward collapse of the bushing members by virtue of the split 8. In Fig. 1 this pressure is applied by means of the follower ring 14 working on the packing 15, the packing being seated against the outer face of the rib 9. Adjustment of the ring 14 can be made by means of the studs 16 and nuts 17.

The inside bushing member 2 is also provided with packing 15 between the valve chamber housing 1 and the rib 9.

Communication between the live steam chamber 18 and the steam passage 19 which leads to the cylinder 20 is established thru the ports 21 in the plug valve 4 when they align with the space between the bushing members and the ports 12 in the port member 11.

It will be seen that the two bushing members 2 and 3 plus the port member 11 constitute in effect one longitudinally adjustable bushing for the piston, adjustment being effected by varying the amount of packing around the member 2 and tightening up or retracting the nuts 17. In this way the laps on the inside and outside of the valve can be changed in a very easy manner not heretofore possible with the present type of valves.

It will be noted that the plug valve 4 is entirely packless, the usual snap rings being omitted. It is possible, of course, to use these snap rings in my valve if desired but this is unnecessary as a perfectly fluid tight joint can be maintained without them by virtue of the collapsible feature. I provide an annular oil basin 22 in the bushing members and oil grooves 23 on the plug valve.

In the modification of Fig. 2 practically the same arrangement is disclosed except that the follower ring 14$^a$ is automatically forced against the packing 15$^a$ by means of a spring 24 the pressure of which can be adjusted by means of the ring 25 and the pins 26 which are threaded thru the cover plate 27.

A more convenient modification is illustrated in Fig. 3. Here the follower ring 14$^b$ is initially adjusted and held in place by means of the studs 28 and nuts 29 after which the cover plate 27 is attached which carries the adjusting pins 26$^a$. In this figure the packings 15$^b$ are also arranged in a slightly different manner, i. e., between the outer faces of the port member 11$^a$ and the inner tapered faces 10 of the ribs 9.

In Fig. 4 as also in Fig. 2 already discussed the ribs 9$^a$ have both faces tapered. The packings 15$^c$ in Fig. 4 have both faces tapered and the follower ring 14$^c$ also has a tapered face contacting with the packing 15$^c$. Adjustment in Fig. 4 is accomplished in the same manner as in Fig. 2.

Further in connection with Fig. 3 it should be pointed out that the spring 24 bears directly against the outside face of the rib 9 inasmuch as the packing is located on the other side of the rib.

I claim:—

The combination of a valve chamber, a piston valve, a pair of split bushing members with opposed tapering surfaces on the exterior, a spacing member surrounding the bushing members between the opposed surfaces, said spacing member having tapered surfaces with which the tapered surfaces on the bushing members are adapted to cooperate, and means for applying endwise pressure to the bushing members to cause inward collapse thereof through the interaction of said tapered surfaces.

In testimony whereof, I have hereunto signed my name.

SAMUEL S. RIEGEL.